Aug. 19, 1958 A. HEMEL 2,848,547
STATION-IDENTIFYING CALL-RECORDING TELEPHONE SYSTEM
Filed Aug. 11, 1955 2 Sheets-Sheet 2
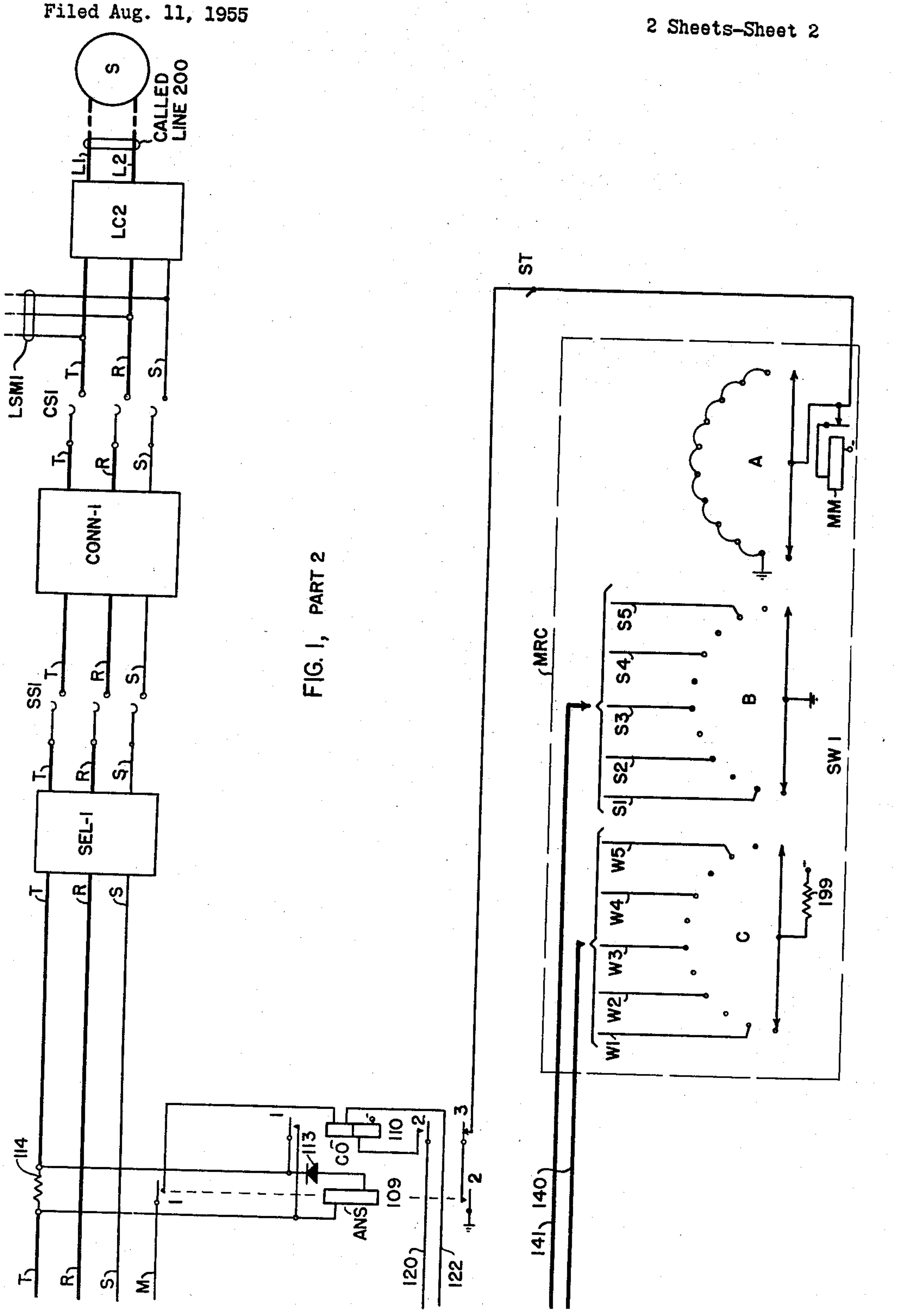
FIG. 1, PART 2

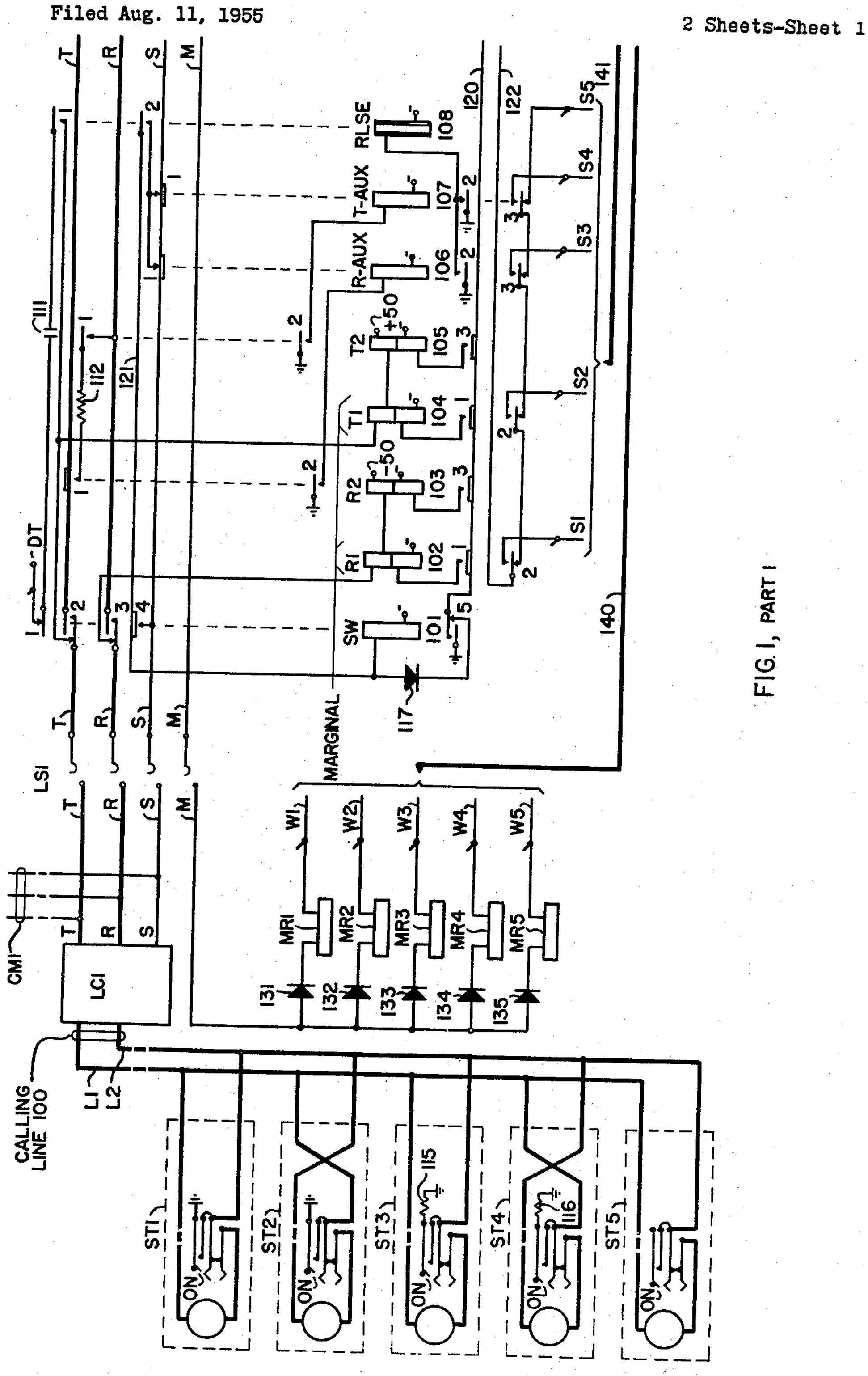
FIG. 1, PART I

United States Patent Office 2,848,547

Patented Aug. 19, 1958

2,848,547

STATION-IDENTIFYING CALL-RECORDING TELEPHONE SYSTEM

Albert Hemel, Skokie, Ill., assignor to International Telephone and Telegraph Corporation, New York, N. Y., a corporation of Maryland Application August 11, 1955, Serial No. 527,709

9 Claims. (Cl. 179—17)

This invention relates to a station-identifying call-recording telephone system wherein calling stations on multi-station lines are automatically identified and a record made of the number of calls completed therefrom. Its principal object is to provide a simple and reliable station-identifying arrangement of the above character which requires a minimum of changes in standard substation equipment and which can readily be applied to existing telephone exchanges.

In telephone systems of the measured service type wherein calling stations are automatically identified responsive to subscriber dialing, numerous arrangements have been provided for transmitting station identifying pulses from the calling station to the exchange equipment. One common arrangement employs a special cam dialing mechanism which transmits impulses characteristic of the calling station. Such an arrangement has the disadvantage that a different station-identifying cam mechanism is required for each station on a multi-station line and that the dial mechanism must be rotated a predetermined angular amount for reliable station-identifying pulse transmission.

The present invention overcomes the above disadvantages in that similar dial mechanism are provided for each station and in that the transmission of a single dialing impulse is sufficient to generate a station-identification pulse. More specifically, a standard dial mechanism is employed which has one additional set of off-normal contacts which are connected differently for each station to distinguish therebetween, the off-normal contacts of the dial mechanism being effective on any angular rotation.

Other arrangements employ non-linear elements, such as neon tubes or the like, at each station, such elements being arranged to conduct at voltages characteristic of the calling station. Such arrangements require either complex marginal detecting relays or require successive applications of identifying voltages, as the identification of the station having the highest voltage requirement results in the conduction of the non-linear elements of the other stations.

The present invention eliminates the necessity for special non-linear elements and the like by employing the dial off-normal contacts for application of a direct ground or a resistance ground to one line conductor or the other. The above arrangement permits simple station-detection circuitry as the exchange equipment needs only to distinguish between direct ground and resistance ground on either of the two line conductors.

The above-mentioned and other objects and features of this invention and the manner of attaining them will become more apparent, and the invention itself will be best understood, by reference to the following description of an embodiment of the invention taken in conjunction with the accompanying drawings comprising Fig. 1, parts 1 and 2; wherein five subscriber stations ST1 to ST5 and associated message registers MR1 to MR5 are shown, connected through the usual line circuit LC1 and line switch LS1 to station-identifying apparatus interposed between the line switch LS1 and the selector and connector stages of the system. This arrangement enhances applying station-detection apparatus to existing equipment as such apparatus is merely interposed between the line switch and the next succeeding switching stage. Each of the five stations ST1 to ST5 are shown in partial detail only, the omitted portions assumed to be well-known. The off-normal contacts ON, shown on each station dial mechanism, are in addition to the usual off-normal contacts, these additional contacts being connected by individual jumpers to direct ground or resistance ground as desired, the dialing mechanism otherwise being of the well-known type.

A detailed description of the operation of the apparatus shown will now be given. For this purpose it will be assumed that the subscriber at station ST1 on calling line 100 desires to converse with the subscriber at station S on called line 200.

When a call is initiated at station ST1 on calling line 100 by the removal of the receiver (not shown), operations occur in line circuit LC1 to initiate line finding action to extend the calling line loop through line switch LS1 and break contacts 2 and 3 of switch relay 101 to positive and negative 50-volt booster battery through the windings of the ring conductor relays 102 and 103 and the tip conductor relays 104 and 105.

Current flow over the noted closed loop operates relays 102 to 105. Make contacts 2 of relays 103 and 105 extend ground potential to the battery-connected winding of ring-auxiliary relay 106 and to the battery-connected winding of tip-auxiliary relay 107, respectively, and make contacts 1 of such relays place resistor 112 across the tip and ring conductors T and R extending to selector SEL–1, closing the line loop thereto.

The closing of the line loop across the tip and ring conductors extending to selector SEL–1 results in the seizure thereof, selector SEL–1 being of the well-known type which returns ground on the sleeve conductor S to maintain the preceding connection intact.

Release relay 108 operates from ground at make contacts 2 of relays 106 and 107, and at its make contacts 1, returns dial tone to the calling station through condenser 111 and break contacts 1 of switch relay 101, the normal dial-tone path from selector SEL–1 being open at such time. Make contacts 2 of relay 108 prepare an operate circuit for switch relay 101 from the noted holding ground on the sleeve conductor S.

In response to the dial-tone signal, the calling subscriber at station ST1 rotates the usual dial finger wheel in preparation for dialing any desired first digit. At such time, off-normal contacts ON of station ST1 extends ground potential directly to the L2 conductor of calling line 100 and to the L1 conductor through the closed contacts of the dial pulsing contacts, such grounds being further extended through switch points on line switch LS1 to ring relays 102 and 103 and to tip relays 104 and 105, maintaining all four line conductor relays 102 to 105 operated.

When the subscriber releases the dial wheel to transmit impulses constituting the first digit, the dial pulsing contacts at station ST1 are momentarily opened and closed in accordance with the impulses constituting such digit. In response to the first opening of the dialing contacts, ground is removed from the line conductor L1, opening the holding circuit of tip conductor relays T1 and T2. Ground is maintained on the L2 conductor as the off-normal contacts are connected directly thereto, independent of the off-normal contacts.

In a standardly-adjusted dial which transmits impulses at the rate of ten impulses per second, the dial contacts are held open for approximately 50 milliseconds and then closed for 50 milliseconds, transmitting the first impulse of any desired digit. Accordingly, during the 50 millisecond interval in which the ground is removed from the L1 conductor, the operate and hold circuits of the tip conductor relays T1 and T2 are opened, permitting such relays to restore.

Responsive to the restoration of the tip conductor relays T1 and T2, make contacts 1 on relay T2 open the line loop extending to selector SEL–1, thereby initiating the repeating of the first impulse to the selector. At the same time, its contacts 2 remove ground from the battery-connected winding of associated auxiliary relay 107, permitting it to restore.

Responsive to the restoration of relay 107, the ground potential appearing on the sleeve conductor S is extended through make contacts 2 of operated release relay 108 to conductor 121, such conductor being connected to the battery-connected winding of switch relay 101 and to wire 120 through break contacts 5 of switch relay 101. The ground on wire 120 is extended through locking contacts 1 of ring conductor R1 and through locking contacts 3 of ring relay R2, maintaining both relays operated.

A short time later, still within the noted 50 millisecond time interval, switch relay 101 operates and locks operated to the sleeve conductor S through its make contacts 4. Make contacts 5 of relay 101 place a solid ground on wire 120 to reduce the apparatus connected to the sleeve conductor; break contacts 1 remove dial tone from the calling subscribers' line; and its make-before-break contacts 2 and 3 isolate relays 102 to 105 from the calling line and extend the calling line loop to the tip and ring conductors extending to selector SEL–1. At such time, the connection of the line loop directly across the tip and ring conductors extending to selector SEL–1 terminates the open condition of the line conductors extending to the selector, thereby terminating the first impulse of the dialed digit.

On the completion of the dialing of the first impulse of the dialed first digit, ring relays R1 and R2 are locked operated to ground at make contacts 5 of operated switching relay 101, ring auxiliary relay 106 is held operated from ground at make contacts 2 of relay 103, and release relay 108 is maintained operated from ground at make contacts 2 of relay 106. Since the switching relay 101 operated to isolate the tip relays T1 and T2 from the calling line at a time they were in a restored condition, such relays remain unoperated responsive to the reclosing of the dial impulsing contacts.

The opening of the dial contacts for the transmission of the next impulse of the series constituting the first digit, results in the transmission of an impulse to selector SEL–1 in the normal way, station ST1 now being connected directly thereto.

The remaining digits of the directory numbers of line 200 are dialed, the line relays of selector SEL–1 and connector CONN–1 are generally similar to relays R2 and T2 of Fig. 1, part 1, in that when station ST1 is calling, the line relay connected to the tip conductor T of selector SEL–1 or connector CONN–1 is restored and reoperated according to the opening and closing of the line loop by the dial contacts, the line relay connected to the ring conductor R being maintained operated.

Responsive to answer by the called party, operations occur in connector CONN–1 to reverse the battery flow over the tip and ring conductors. Responsive to reverse-current flow, answer relay 109 operates and is held operated, its operate and hold circuit including rectifier 113, which is so poled as to permit current flow only in the reverse direction from the seizure current flow. Make contacts 2 of answer relay 109 extend ground potential through break contacts 3 of cutoff relay 110 to start wire ST, such ground passing through the self-interrupting contacts on motor magnet MM1, to energize the winding thereof. At the same time, the meter wire M is extended through make contacts 1 of answer relay 109 and through the upper winding of cutoff relay 110 to wire 122, such wire being connected through make contacts 2 of operated ring relay 102 to the station-1 wire S1 extending to message register controller MRC over associated conductors in cable 141.

Message register controller MRC is common to a group of station identifying units, it functioning to match message register wires with station wires responsive to ground appearing on its start wire ST.

The appearance of ground on start wire ST, responsive to the operation of answer relay 109, energizes the winding of motor magnet MM of switch SW1. Switch SW1 operates and at its break contacts opens its operate circuit to deenergize the magnet winding and advances its three brushes A, B, and C one step, positioning them on the first contact set of their respective banks. Responsive to the consequent deenergization of the magnet winding the operate circuit to the start wire ST is again completed. The ground on wire ST reoperates the switch, causing it to open its operate circuit again and to advance its brushes one step further. The break contacts are closed again and ground reenergizes the winding of the magnet as before described. This operation is repeated at long as ground appears on the switch break contacts from the start wire ST or from the brush A bank multiple, the brushes of switch SW1 being advanced step-by-step across its bank contacts. In the event ground is removed from wire ST while switch SW1 is not in home position, the ground on brush A advances it to such position, no ground normalling appearing on brush A when the switch is in home position.

Responsive to the advancement of the three brushes across the associated banks of switch SW1, ground potential connected to brush B is placed in succession on each of the five station wires S1 to S5 of cable 141 and battery potential connected to brush C through resistance 199 is extended to wires W1 to W5 in succession, these wires extending to the message registers MR1 to MR5 over conductors in cable 140. At the time ground is placed on station wire S1, resistance battery is placed on wire W1; when ground appears on wire S2, battery appears on wire W2; and so forth.

Assuming brushes A to C to be positioned on the first contacts of the respective banks, ground appears on wire S1 and is extended through make contacts 2 of operated relay 102, the upper winding of cutoff relay 110, make contacts 1 of answer relay 109, and through crosspoint contacts on line switch LS1 to the message registers associated with the calling line. At the same time, battery potential appears on wire W1, associated with message register MR1, resulting in the operation of the message register MR1 to record the completion of the call from the first station. Rectifier 131 prevents any back-ups from occurring to falsely operate additional registers.

The current flow resulting from the completion of the operate circuit for the message register MR1 operates cutoff relay 110 which locks operated to the ground potential on locking conductor 120. Cutoff relay 110, at its break contacts 3, opens the ground appearing on the start wire ST, preventing unnecessary recycling of switch SW1, and its make contacts 1, short-circuits the winding of answer relay 109, permitting it to restore and also short-circuits resistance 114 to improve talking conditions. Responsive to the consequent restoration of answer relay 109, the meter wire circuit is open, completing the deliverance of one charge impulse to the message register MR1.

With cutoff relay 110 maintained continuously operated, a subsequent flicking of the hook-switch by the called party, resulting in corresponding battery-reversal changes, does not permit reoperation of relay 109 and no additional charges can be made against the calling station.

Responsive to disconnect by the calling and called parties, ground potential is removed from the sleeve conductor S as is well-known, resulting in the restoration of switch relay 101. Responsive to its restoration, ground is removed from locking conductor 120 permitting relays 102, 103, and 110 to restore. Responsive to restoration of relay 103, relay 106 restores, and restores release relay 108 to return the station-identifying apparatus to normal position, rectifier 117 preventing momentary ground from contacts 5 of switch relay 101 for reoperating it, resulting in a buzzing condition.

Assuming a call is initiated by the subscriber at station S2, the operations are generally as hereinbefore described, with the exception that the tip relays T1 and T2 are maintained operated from the ground at the off-normal contacts of the dial in place of the ring relays R1 and R2, this being apparent from the reversal of the line conductors L1 and L2. Accordingly, responsive to the opening of the dial pulsing contacts, ring relays R1 and R2 restore and restore ring auxiliary relay 106, tip auxiliary relay 107 remaining operated. At such time, an operate circuit for switching relay 101 is completed through break contacts 1 of ring auxiliary relay 106 and make contacts 2 of release relay 108. Relay 101 operates and the hereinbefore described operations occur in response to the completion of the call to line 200.

When the called party answers, the station wire S2 is connected to the meter wire M to operate the message register MR2 through the associated rectifier 132 in the manner hereinbefore described when the switch SW1 positions its brushes on the corresponding bank contacts.

Assuming the subscriber at station ST3 initiated a call, rotation of the dial finger wheel results in a closure of the off-normal contacts ON, which places a resistance ground on line conductors L1 and L2. Relays R1 and T1 restore, relays R2 and T2 remaining operated, as the resistance of resistor 115 is such that the current flow therethrough is too small in value to maintain the ring relay R1 and the tip relay T1 operated, but sufficient to hold relays R2 and T2 operated. Consequently, responsive to the opening of the dial contacts on the first pulse of the desired digit, relay R2 is the only relay maintained operated, tip relay T2 restoring as resistance ground is removed from the line conductor L2 by the opening of the dial pulsing contacts. At such time, ring relay R2 locks operated through its make contacts 3 to ground at contacts 5 of relay 101, which operated from the sleeve ground. With relay R2 operated, the hereinbefore described operations occur, resulting in the operation of message register MR3 through make contacts on relay R2 and break contacts on relays T1 and R1.

Responsive to the initiation of a call from station ST4, the operation for energizing message register MR4 is generally as noted for the operation in energizing message register MR3, excepting that the tip relay T2 is the only one of relays 102 to 105 that is operated at the time that switching relay 101 operates. Consequently, contacts 3 of tip auxiliary relay 107 connect station-4 wire S4 to the meter wire M extending to the message registers to operate the associated message register MR4.

Assuming the subscriber at station ST5 initiates a call, all four relays 102 to 105 are operated responsive to seizure and in response to the opening of the pulsing contacts all four relays restore as the dial off-normal contacts have no ground connected thereto. In such event, the ring auxiliary and tip auxiliary relays restore and open-circuit the operate path of release relay 108. At such time, with relays 106 and 107 restored and release relay 108 operated, switching relay 101 operates in the manner hereinbefore described. However, switch relay 101 is the only relay operated and responsive to answer by the called party and the hereinbefore described operation of SW1, ground appeared on the station-5 wire S5 and is extended to the meter wire M to operate the associated message register MR5, the operate circuit including break contacts on relays 102 to 105.

From the foregoing, it will be noted that a calling station on any party line is identified responsive to the transmission of any digit impulse, this arrangement being independent of the angular rotation of the dial. It will be further noted that the described station-detection arrangement requires a simple marginal relay arrangement which is required only to discriminate between a resistance ground and a solid ground. It is apparent that the employment of various valued resistances, similar to resistances 115 to 116, together with additional marginal relays in circuit with the noted line relays 102 to 105, would permit the station-identifying arrangements hereinbefore described to be increased to handle more stations on a line.

While I have described above the principles of my invention in connection with specific apparatus, it is to be clearly understood that this description is made only by way of example and not as a limitation to the scope of my invention.

I claim:

1. In a telephone system wherein an automatic telephone exchange serves two-conductor common-battery lines extending from the exchange to subscriber stations, with each station including a switch arranged to close and to open a series loop over the conductor of its associated line to initiate and to terminate a calling condition, and including a calling device arranged to produce successive series of momentary loop interruptions indicative of respective digits in the number of a line being called, certain of the lines being party lines each having at least a first station and a second station thereon, means providing a common conductor at each party-line station constituting a connection to the common battery at the exchange, means at each said station on any calling party line for making an identifying connection to a separate conductor of the associated line from the said common conductor during an interval when the calling device at that station produces a said interruption of the loop, means in the exchange controlled over any calling one of the said party lines for detecting the conductor to which the identifying connection is made, and station identifying means including the last said means.

2. In a telephone system wherein an automatic telephone exchange serves two-conductor common-battery lines extending from the exchange to subscriber stations, with each station including a switch arranged to close and to open a series loop over the conductors of its associated line to initiate and to terminate a calling condition, and including a calling device arranged to produce successive series of momentary loop interruptions indicative of respective digits in the number of a line being called, certain of the lines being party lines each having at least a first station and a second station thereon, means providing a common conductor at each party-line station constituting a connection to the common battery at the exchange, means included in the calling device at each said station on any calling party line for making a connection of a resistance characteristic of that station to a conductor of the associated line from the said common conductor during an interval when the calling device at that station produces a said interruption of the loop, means in the exchange controlled over any calling one of the said party lines for detecting the resistance characteristic of the said connection to a conductor thereof, and station identifying means including the last said means.

3. A telephone system according to claim 2, wherein the said connection characteristic of the first station and the said connection characteristic of the second station are both to the same conductor of the associated party line and wherein the said party lines have at least a third station thereon, means at the third station for making a said connection to the other conductor of the associated line, and means in the said detecting means in the exchange for detecting the conductor to which the said connection characteristic of a calling station is made.

4. A telephone system according to claim 2, wherein the said party lines have four stations thereon comprising first and second pairs of stations each including a said first station and a said second station, and wherein the stations of the first pair include means for making the said connection to the first conductor and the stations of the second pair include means for making the said connection of the second conductor, impedance devices corresponding respectively to the said second stations, means included in the said means of the second station of each pair of stations for including the associated impedance device in the said connection to the common conductor, the said detecting means detecting the calling station as the second station on the calling line instead of the first station responsive to the said connection made by the calling station including the said impedance device and detecting the pair of stations including the calling station according to the line conductor to which the said connection is made.

5. A telephone system according to claim 1, wherein current flow is normally maintained over the conductors in series of the calling line and wherein it is maintained over the conductor to which the said identifying connection is made but is terminated over the other conductor upon the line loop being interrupted by the calling device at the calling station, the said detecting means including relay means and means for operating it responsive to current flow over the two conductors in series, the said relay means being held operated or not according to the line conductor over which the current flow is maintained while the current flow over the other conductor is terminated.

6. A telephone system according to claim 1, wherein current flow is maintained over the conductor to which the said identifying connection is made but is terminated over the other conductor upon the line loop being interrupted by the calling device at the calling station, the said detecting means including separate relay means for the respective line conductors each responsive according to the line conductor over which the said current flow is maintained while the current flow over the other conductor is terminated.

7. A telephone system according to claim 4 wherein current flow is maintained over the said first conductor and interrupted over the second conductor when the line loop is interrupted by the calling device at the calling station and wherein current flow over the first conductor is altered responsive to the said momentary line loop interruptions when the said connection to the first line conductor includes an impedance device, first and second relay means in the said detecting means operable responsive to current flow over the conductors in series, means responsive to the said altered current flow maintaining only one of said relay means operated, and means controlled by the operation of one relay means and the restoration of the other for controlling the said station-identifying means to identify the calling station on the calling line as the first station.

8. A telephone system according to claim 4 wherein current flow is maintained over the conductor to which the said connection is made while the current flow over the other conductor is interrupted responsive to the said momentary line loop interruptions by the calling device at the calling station and wherein current flow over the conductor connected to the common conductor is altered responsive to the said momentary line loop interruptions when the concerned connection includes an impedance device, the said detecting means including first and second relay means for each of the two line conductors operable responsive to current flow over the two conductors in series and including means responsive to the calling station being a station of the first pair for restoring the first and second relay means associated with the second conductor responsive to the said line loop interruptions, means controlled by the first and second relay means associated with any line conductor being held operated when the line loop is interrupted for controlling the station-identifying means to identify the pair of stations including the calling station, and means controlled by the operation of the first relay means and the restoration of the second relay means associated with the same conductor for controlling the station-identifying means to identify the calling station as the first station of the said identified pair.

9. A telephone system according to claim 1 wherein the said calling device includes a dialing mechanism having a normal position and being variably operable away therefrom and returnable thereto to produce the said momentary loop interruptions, off-normal contact means and means for operating them responsive to any angular rotation of the said dialing mechanism, and the said means for making the said identifying connection being controlled by the said off-normal contact means.

References Cited in the file of this patent

UNITED STATES PATENTS

| | | |
|---|---|---|
| 2,277,623 | Allen | Mar. 24, 1942 |
| 2,535,765 | Voss | Dec. 26, 1950 |
| 2,615,094 | Mitchell | Oct. 21, 1952 |
| 2,619,546 | Myers | Nov. 25, 1952 |